United States Patent
Glugla

(10) Patent No.: US 10,947,946 B2
(45) Date of Patent: Mar. 16, 2021

(54) ENHANCED VDE KNOCK CONTROL

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1679 days.

(21) Appl. No.: 13/900,421

(22) Filed: May 22, 2013

(65) Prior Publication Data

US 2014/0350823 A1 Nov. 27, 2014

(51) Int. Cl.
*F02P 5/152* (2006.01)
*F02D 41/00* (2006.01)

(52) U.S. Cl.
CPC .......... *F02P 5/152* (2013.01); *F02D 41/0087* (2013.01); *F02P 5/1522* (2013.01); *Y02T 10/40* (2013.01)

(58) Field of Classification Search
CPC ..... F02P 5/152; F02P 5/1522; F02D 41/0087; F02D 35/027; F02D 41/1498; F02D 41/042; F02D 2009/0245; F01L 2013/001
USPC ....... 701/104, 111, 112; 123/406.21, 406.29, 123/481, 198 F
See application file for complete search history.

(56) References Cited

U.S. PATENT DOCUMENTS

| | | | | |
|---|---|---|---|---|
| 4,129,109 A | * | 12/1978 | Matsumoto | F02D 41/0087 123/198 F |
| 4,483,295 A | * | 11/1984 | Iida | F02D 37/02 123/406.21 |
| 4,760,828 A | * | 8/1988 | Shimada | F02B 75/16 123/406.21 |
| 5,505,176 A | * | 4/1996 | Ishii | F02P 5/1521 123/406.4 |
| 7,913,669 B2 | | 3/2011 | Luken et al. | |
| 7,946,275 B2 | * | 5/2011 | Mc Donald | B60W 10/06 123/481 |
| 2003/0102175 A1 | | 6/2003 | Wakashiro et al. | |

(Continued)

FOREIGN PATENT DOCUMENTS

| CN | 1550653 A | 12/2004 |
|---|---|---|
| CN | 102465782 A | 5/2012 |

(Continued)

OTHER PUBLICATIONS

Partial Translation of Office Action of Chinese Patent Application No. 201410205435.X, dated Feb. 21, 2017, State Intellectual Property Office of PRC, 10 pages.

*Primary Examiner* — Mahmoud Gimie
*Assistant Examiner* — Joshua Campbell
(74) *Attorney, Agent, or Firm* — Geoffrey Brumbaugh McCoy Russell LLP

(57) ABSTRACT

Systems and methods for adjusting ignition timing to one or more cylinders of a variable displacement engine responsive to a knock indication are described herein. In one particular example, during a partial cylinder mode, ignition timing to one or more cylinders may be adjusted responsive to a knock indication based on the number of cylinders deactivated; whereas during the full cylinder mode, ignition timing for all cylinders are adjusted responsive to a knock indication. Thereby, the systems and methods described allow a larger partial cylinder operating window that has a benefit of enhancing a vehicle's fuel economy.

21 Claims, 7 Drawing Sheets

(56) References Cited

U.S. PATENT DOCUMENTS

| | | | |
|---|---|---|---|
| 2004/0158388 A1* | 8/2004 | Fujiwara | F02D 13/06 701/111 |
| 2004/0226539 A1* | 11/2004 | Takahashi | F02D 17/02 123/406.33 |
| 2007/0215107 A1* | 9/2007 | Shelby | F02D 41/0087 123/406.26 |
| 2008/0098969 A1* | 5/2008 | Reed | F02D 13/0215 123/64 |
| 2008/0115759 A1* | 5/2008 | Russell | F02D 13/06 123/198 F |
| 2010/0108031 A1* | 5/2010 | Pursifull | F02P 5/1508 123/406.5 |
| 2011/0265454 A1* | 11/2011 | Smith | F01N 3/0842 60/274 |
| 2011/0265771 A1* | 11/2011 | Banker | F01N 3/0814 123/564 |
| 2012/0111302 A1* | 5/2012 | Shishime | F02D 41/405 123/299 |
| 2012/0285161 A1 | 11/2012 | Kerns et al. | |
| 2012/0296550 A1 | 11/2012 | Rollinger et al. | |
| 2013/0013165 A1 | 1/2013 | Doering et al. | |

FOREIGN PATENT DOCUMENTS

| | | | | |
|---|---|---|---|---|
| EP | 1612393 B1 | 4/2010 | | |
| JP | 58035242 A | * | 3/1983 | F02D 17/02 |
| JP | 01147159 A | * | 6/1989 | |
| JP | 10169537 A | * | 6/1998 | |

\* cited by examiner

ENHANCED VDE KNOCK CONTROL

FIELD

The present description relates to a system and method for controlling knock in a variable displacement engine (VDE).

BACKGROUND AND SUMMARY

Variable displacement engines may deactivate cylinders during the drive cycle based on engine speed and load, for example, to reduce fuel consumption and emissions emitted therefrom. During partial cylinder operation, the active cylinders operate at a higher load than they otherwise would for the overall torque level generated by the engine. During these higher load conditions, engine knock may be more prevalent. As such, ignition timing may be retarded in the engine cylinders to abate knock.

The inventors herein have recognized a disadvantage with the above approach. Namely, the amount of ignition timing retard applied to multiple cylinders of the engine to abate knock may result in fuel economy losses greater than the fuel economy gained by VDE operation. Thus, due to the knock control, such as wherein multiple cylinders have spark timing retarded in response to knock, the benefits of VDE operation can be negated.

One approach to at least partially address the above identified issues may include a method, comprising during partial cylinder operation, adjusting a selected cylinder's ignition timing, and only that cylinder's ignition timing, responsive to a knock indication for the selected cylinder, and during full cylinder operation, adjusting multiple cylinders' ignition timing responsive to a knock indication for a cylinder. In this way, only as much ignition timing retard as is appropriate based on the operational state of the engine is utilized during cylinder deactivation operation, thereby retaining the fuel economy benefit of the cylinder deactivation. Further, because at least some cylinders are deactivated, it may be possible to perform individual cylinder knock control because the distance (crank angle) between combustion events is increased and so it may be easier to determine which individual cylinder is knocking from a block mounted knock sensor. As such, precisely when individual cylinder knock control can provide advantages (retaining cylinder deactivation fuel economy benefits relative to full cylinder operation) is precisely when individual cylinder knock sensing is most easily achieved (due to the increased crank angle spacing between combustion events). Additionally, during full cylinder operation, individual cylinder knock control can be disabled, and multiple (or all) cylinders can have ignition timing retard tied together responsive to knock indications.

In another example, the method comprises during operation with less active cylinders, adjusting a selected active cylinder's ignition timing responsive to a first knock indication; and during operation with more active cylinders, adjusting multiple cylinders' ignition timing responsive to a second knock indication. Thereby, differential timing adjustments can be made based on the operational state of the vehicle that serves to enhance vehicle fuel economy. A technical effect of this approach is retaining fuel economy benefits achieved during operation with less active cylinder by taking advantage of cylinder-specific knock control.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
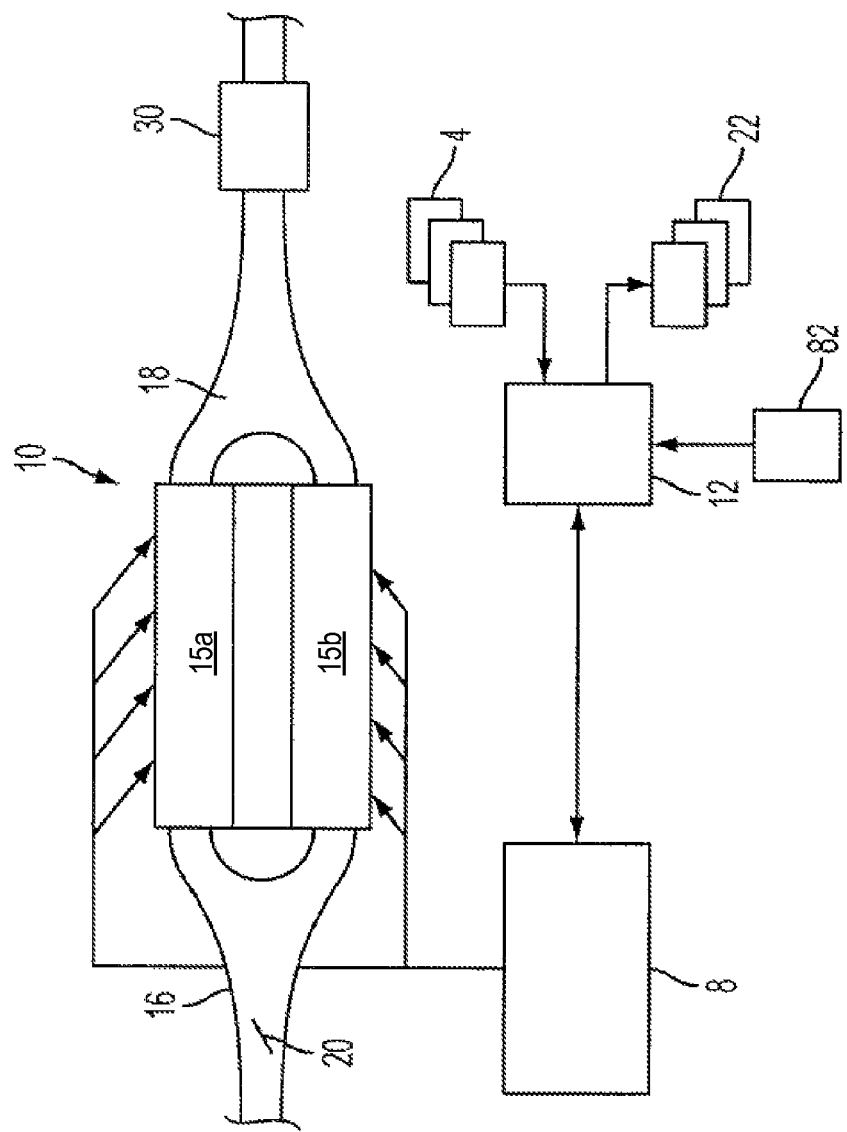
FIG. 1 shows an example layout of a variable displacement engine system.
Figure 2:
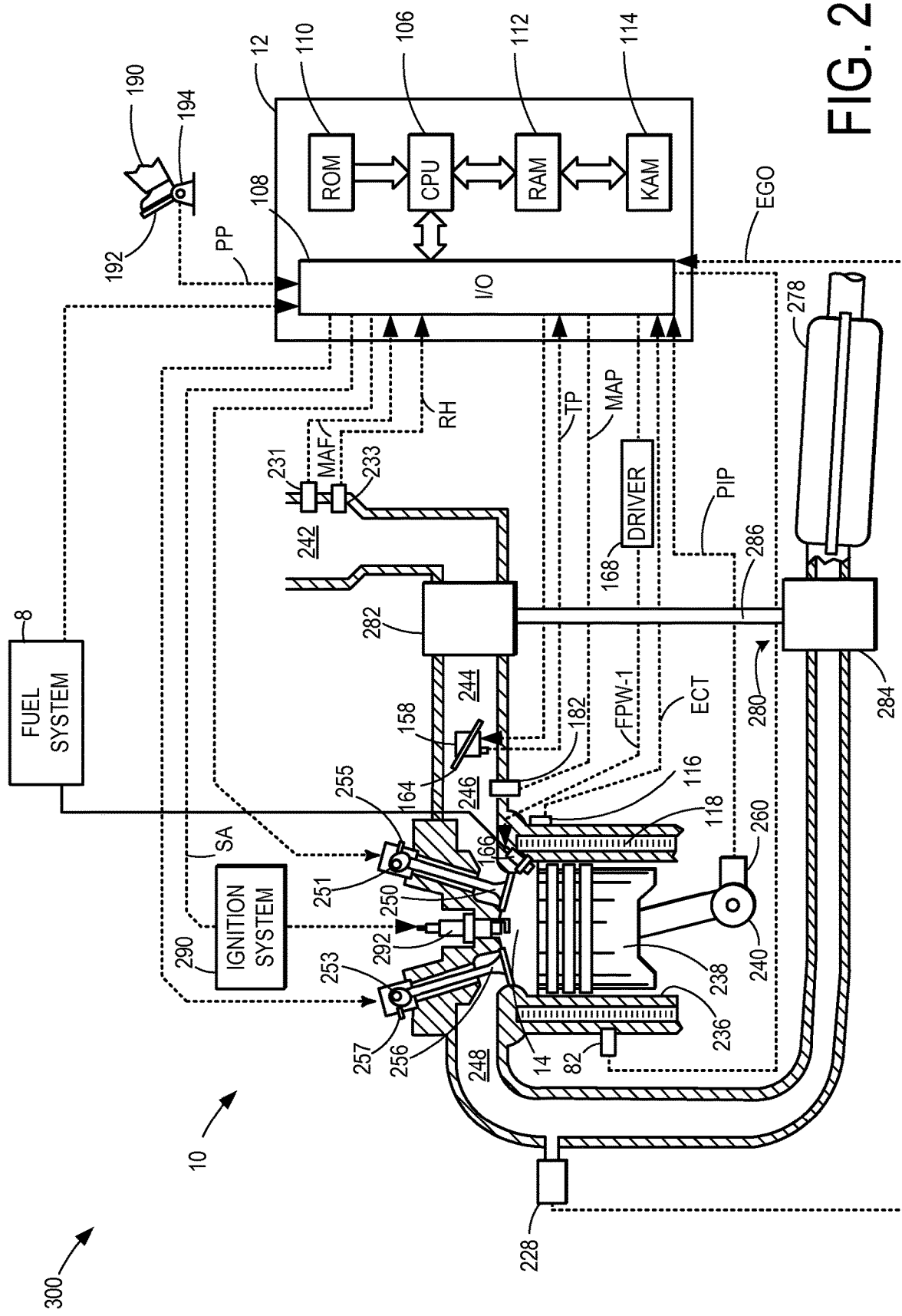
FIG. 2 shows a partial engine view of the engine system of FIG. 1.

The following description relates to systems and methods for adjusting cylinder operation in a boosted engine system (such as the VDE engine system of FIGS. 1-2). The engine system may switch between operation with all cylinders firing or fewer cylinders firing by selectively deactivating one or more cylinder fuel injectors.

FIG. 1 shows an example variable displacement engine (VDE) 10 having a first bank 15a and a second bank 15b. In the depicted example, engine 10 is a V8 engine with the first and second banks each having four cylinders. Engine 10 has an intake manifold 16, with throttle 20, and an exhaust manifold 18 coupled to an emission control system 30. Emission control system 30 includes one or more catalysts and air-fuel ratio sensors. As one non-limiting example, engine 10 can be included as part of a propulsion system for a passenger vehicle.

During selected conditions, such as when the full torque capability of the engine is not needed, one of a first or a second cylinder group may be selected for deactivation (herein also referred to as a VDE mode of operation). Specifically, one or more cylinders of the selected group of cylinders may be deactivated by shutting off respective fuel injectors while maintaining operation of the intake and exhaust valves such that air may continue to be pumped through the cylinders. While fuel injectors of the disabled cylinders are turned off, the remaining enabled cylinders continue to carry out combustion with fuel injectors active and operating. To meet the torque requirements, the engine produces the same amount of torque on those cylinders for which the injectors remain enabled. This requires higher manifold pressures, resulting in lowered pumping losses and increased engine efficiency. Also, the lower effective surface area (from the enabled cylinders) exposed to combustion reduces engine heat losses, improving the thermal efficiency of the engine. In alternate examples, engine system 10 may have cylinders with selectively deactivatable intake and/or exhaust valves.

Cylinders may be grouped for deactivation in a bank-specific manner. For example, in FIG. 1, the first group of cylinders may include the four cylinders of the first bank 15a while the second group of cylinders may include the four cylinders of the second bank 15b. In an alternate example, instead of one or more cylinders from each bank being deactivated together, two cylinders from each bank of the V8 engine may be selectively deactivated together.

Engine 10 may operate on a plurality of substances, which may be delivered via fuel system 8. Engine 10 may be controlled at least partially by a control system including controller 12. Controller 12 may receive various signals from sensors 4 coupled to engine 10, and send control signals to various actuators 22 coupled to the engine and/or vehicle.

Fuel system 8 may be further coupled to a fuel vapor recovery system (not shown) including one or more canisters for storing refueling and diurnal fuel vapors. During selected conditions, one or more valves of the fuel vapor recovery system may be adjusted to purge the stored fuel vapors to the engine intake manifold to improve fuel economy and reduce exhaust emissions. In one example, the purge vapors may be directed near the intake valve of specific cylinders. For example, during a VDE mode of operation, purge vapors may be directed only to the cylinders that are firing. This may be achieved in engines configured with distinct intake manifolds for distinct groups of cylinders. Alternatively, one or more vapor management valves may be controlled to determine which cylinder gets the purge vapors.

Controller 12 may receive an indication of cylinder knock from one or more knock sensors 82 distributed along the engine block. When included, the plurality of knock sensors may be distributed symmetrically or asymmetrically along the engine block. As such, the one or more knock sensors 82 may be accelerometers, ionization, or cylinder pressure sensors. Further details of the engine 10 and an example cylinder are described with regard to FIG. 2.

FIG. 2 depicts an example embodiment 300 of a cylinder or combustion chamber of internal combustion engine 10. Engine 10 may receive control parameters from controller 12 and input from vehicle operator 190 via an input device 192, such as an accelerator pedal and a pedal position sensor 194 for generating a proportional pedal position signal PP. Cylinder (herein also "combustion chamber") 14 of engine 10 may include combustion chamber walls 236 with piston 238 positioned therein. Piston 238 may be coupled to crankshaft 240 so that reciprocating motion of the piston is translated into rotational motion of the crankshaft. Crankshaft 240 may be coupled to at least one drive wheel of the passenger vehicle via a transmission system. Further, a starter motor may be coupled to crankshaft 240 via a flywheel to enable a starting operation of engine 10.

Cylinder 14 can receive intake air via a series of intake air passages 242, 244, and 246. Intake air passage 246 can communicate with other cylinders of engine 10 in addition to cylinder 14. In some embodiments, one or more of the intake passages may include a boosting device such as a turbocharger 280. For example, FIG. 2 shows engine 10 configured with a turbocharger including a compressor 282 arranged between intake passages 242 and 244, and an exhaust turbine 284 arranged along exhaust passage 248. Compressor 282 may be at least partially powered by exhaust turbine 284 via a shaft 286 where the boosting device is configured as a turbocharger. A throttle valve 158 including a throttle plate 164 may be provided along an intake passage of the engine for varying the flow rate and/or pressure of intake air provided to the engine cylinders. For example, throttle valve 158 may be disposed downstream of compressor 282 as shown in FIG. 2, or alternatively may be provided upstream of a compressor. In some embodiments, throttle valve 158 may be omitted wherein the intake passage may include one or more backflow throttle valves for varying the flow rate and/or pressure of the intake air.

Exhaust passage 248 can receive exhaust gases from other cylinders of engine 10 in addition to cylinder 14. Exhaust gas sensor 228 is shown coupled to exhaust passage 248 upstream of emission control device 278. Sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 278 may be a three way catalyst (TWC), NOx trap, various other emission control devices, or combinations thereof.

Exhaust temperature may be estimated by one or more temperature sensors (not shown) located in exhaust passage 248. Alternatively, exhaust temperature may be inferred based on engine operating conditions such as speed, load, air-fuel ratio (AFR), spark retard, etc. Further, exhaust temperature may be computed by one or more exhaust gas sensors 228. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 250 and at least one exhaust poppet valve 256 located at an upper region of cylinder 14. In some embodiments, each cylinder of engine 10, including cylinder 14, may include at least two intake poppet valves and at least two exhaust poppet valves located at an upper region of the cylinder. Operation of intake valve 250 and exhaust valve 256 may be controlled by cam actuation via respective cam actuation systems 251 and 253. Cam actuation systems 251 and 253 may each include one or more cams and may utilize one or more of cam profile switching (CPS), variable cam timing (VCT), variable valve timing (VVT) and/or variable valve lift (VVL) systems that may be operated by controller 12 to vary valve operation. In alternative embodiments, the intake and/or exhaust valve may be controlled by electric valve actuation. In one example, cylinder 14 may include an intake valve controlled via cam actuation including VCT systems and an exhaust valve controlled via electric valve actuation. In one example, during a VDE mode of operation, when one or more fuel injectors are disabled, the camshaft timing for the enabled cylinders may be adjusted based on the desired torque while the camshaft timing for the disabled cylinders is adjusted to reduce pumping losses. Additionally, or optionally, a camshaft timing may be selected for the disabled cylinders that further reduces air flow through the disabled cylinder group, thereby lowering the airflow through the downstream catalyst.

In some embodiments, each cylinder of engine 10 may include a spark plug 292 for initiating combustion. Ignition system 290 can provide an ignition spark to combustion chamber 14 via spark plug 292 in response to spark advance signal SA from controller 12, under select operating modes.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Controller 12 is shown in FIG. 2 as a microcomputer, including microprocessor unit 106, input/output ports 108, an electronic storage medium for executable programs and calibration values shown as read only memory (ROM) chip 110 in this particular example, random access memory (RAM) 112, keep alive memory (KAM) 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 231; relative humidity (RH) from humidity sensor 233; engine coolant temperature (ECT) from temperature sensor 116 coupled to cooling sleeve 118; a profile ignition pickup signal (PIP) from Hall effect sensor 260 (or other type) coupled to crankshaft 240; throttle position (TP) from a throttle position sensor; and absolute manifold air pressure signal (MAP) from sensor 182. Engine speed signal, RPM, may be generated by controller 12 from signal PIP. Further, crankshaft position, as well as crankshaft acceleration, and crankshaft oscillations may also be identified based on the signal PIP. Manifold air pressure signal MAP from manifold pressure sensor 182 may be used to provide an indication of vacuum, or pressure, in the intake manifold. Further, as noted herein, manifold pressure may be estimated based on other operating parameters, such as based on MAF and RPM, for example.

As described above, FIG. 2 shows only one cylinder of a multi-cylinder engine, and as such, each cylinder may similarly include its own set of intake/exhaust valves, fuel injector, spark plug, knock sensor, etc.

The engine controller may periodically perform various on-board diagnostic tests to verify the functionality of the various valves and sensors of FIGS. 1-2. In one example, such as when the engine is in the non-VDE mode, the various tests may be performed only during deceleration fuel shut-off. In another example, when the engine is in the VDE mode, diagnostic routines may be executed on the disabled group of cylinders. In one example, based on an estimated amount of time that the engine is expected to operate in the VDE mode, one or more diagnostic tests may be selected (e.g., oxygen sensor control).

Although the description below relates to a V8 engine capable of deactivating four cylinders (e.g. 4 cylinder deactivation mode and 8-cylinder non-deactivation mode), any number of different engine types and various other engine configurations may be used. As such, the examples described herein also apply to an engine with 4, 6, 10, 12 or any other number of engine cylinders. Additionally, these examples can be extended to systems where multiple deactivation modes are available (e.g. 2, 4, or 6 cylinder operation for a V8 engine).

Figure 3:
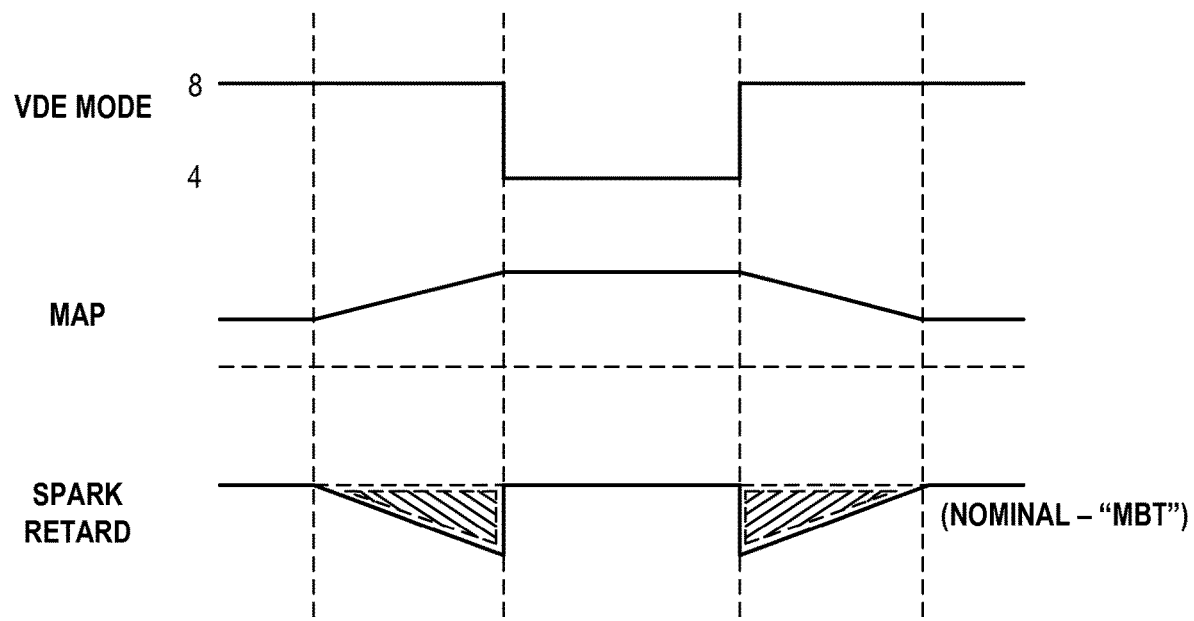
FIG. 3 is a graph showing an example operation for switching between engine operating modes.

One approach to managing mode transitions utilizes coordination of ignition timing retard and throttle position. When running in a deactivation, or VDE mode, the manifold pressure is increased to maintain substantially equivalent torque. Since throttle position may not immediately change airflow into the VDE engine (due to throttle response lag and manifold filling), spark retard may be used to counter the increasing manifold pressure and thereby reduce engine torque throughout the transition to the new desired set point (see FIG. 3). While spark is one variable that may be used to reduce engine output while enabling or disabling cylinders, any combination of spark timing, fuel injection (e.g. enrichment or enleanment), or injector cutout could be used to maintain engine torque, or power, throughout the transition. As shown in FIG. 3, such an approach may result in energy loss (and thereby degrade fuel economy) during the transitions. In other words, spark retard is able to rapidly reduce torque, but results in inefficient use of the injected fuel. Note that FIG. 3 shows spark retard/advance from a nominal value, which may be maximum torque for best torque (MBT).

Figure 4A:
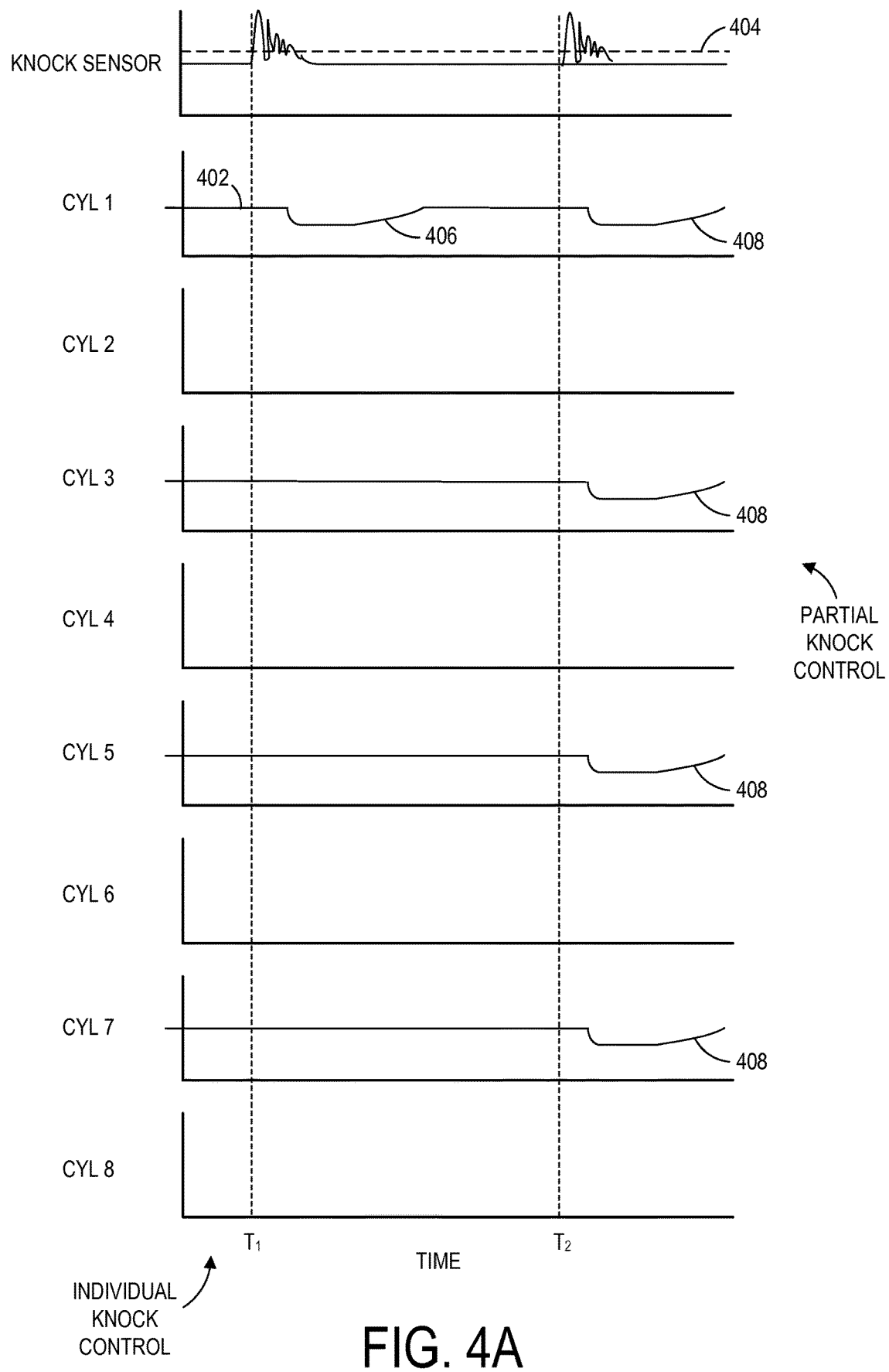
FIGS. 4A-B show example graphs for adjusting an ignition timing based on the engine operating mode.
Figure 4B:
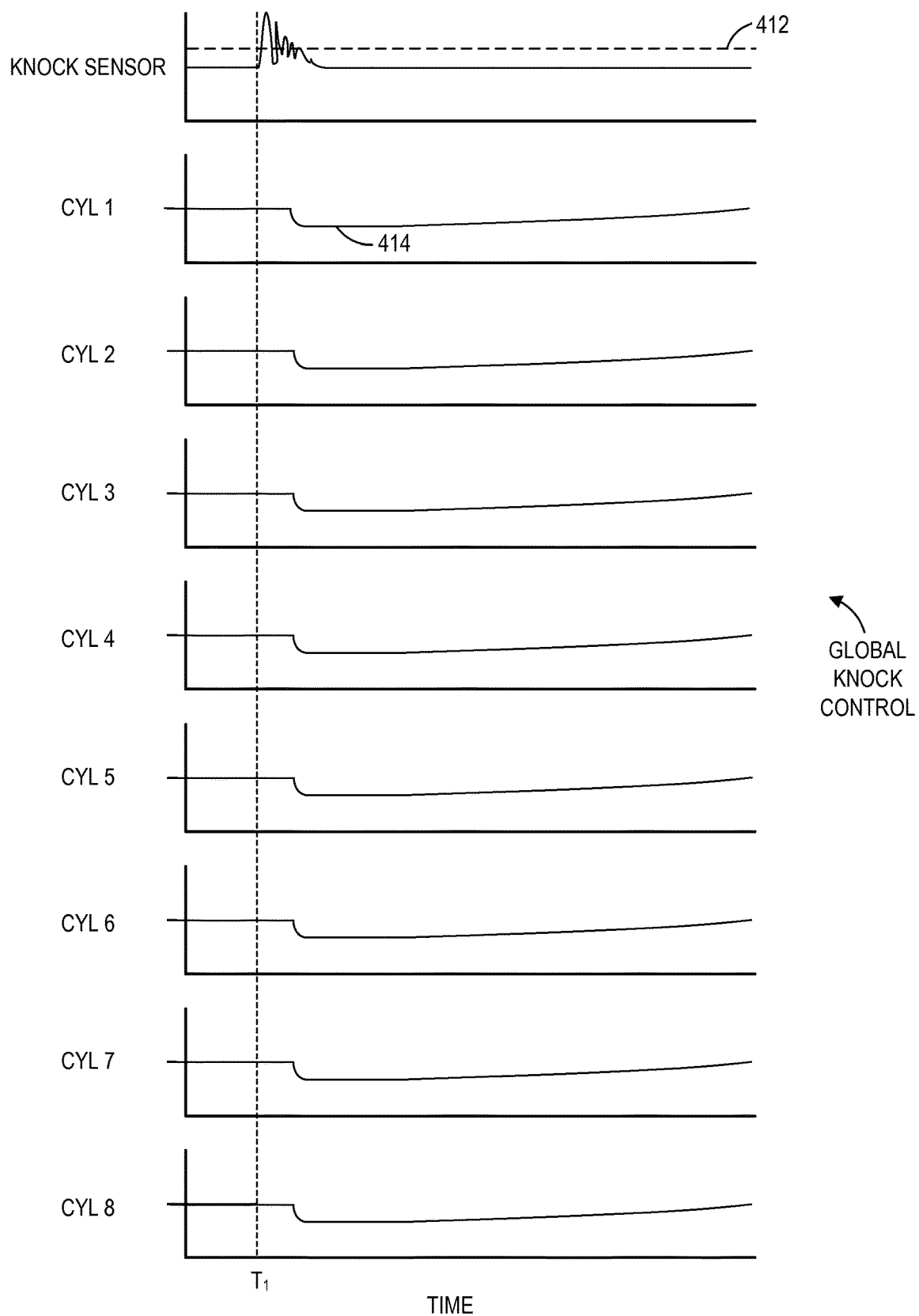

Turning to knock detection and the methods for mitigating knock based on the engine operating mode, FIGS. 4A-B show example graphs that illustrate example methods by which spark timing may be adjusted in response to knock during both VDE (e.g., partial cylinder) operation and non-VDE (e.g., full cylinder) operation, respectively. The method comprises adjusting ignition timing for multiple cylinders' responsive to a knock indication for a cylinder during partial cylinder operation (e.g., partial knock control) and adjusting all cylinders' ignition timing responsive to a knock indication for a cylinder during full cylinder operation (e.g., global knock control). In some embodiments, the method may also and/or alternatively include using individual knock control for a selected cylinder by adjusting a selected cylinder's ignition timing responsive to a knock indication for the selected cylinder. That is, either individual knock control or global knock control can be selectively performed based on the engine operating conditions. In FIGS. 4A-B, the top plot shows a schematic knock sensor output as a function of time, which may represent, for instance, the engine crank cycle. Then, each plot represents a cylinder output (e.g., from one of the eight cylinders) relative to MBT. For simplicity, time is represented generally and shown along the x-axis of the bottom plot. Time increases from left to right.

In FIG. 4A, example knock responses during the VDE operating mode are shown for illustration. As noted above, in one embodiment operating a vehicle in the VDE operating mode includes deactivating one bank of engine cylinders. Therefore, no signals are shown for CYLS. 2, 4, 6, and 8 that comprise a cylinder bank within the example V8 engine. In another example, the other bank of cylinders (e.g., CYLS 1, 3, 5, and 7) may be alternatively deactivated. In still other examples, two cylinders from each bank may be selectively deactivated while in still further non-limiting examples, the number of cylinders deactivated may depend on the engine operating conditions. For example, by deactivating 2 or 6 cylinders based on the engine output.

As shown therein, each cylinder within the example V8 engine operates at MBT during the engine drive cycle as indicated by horizontal line 402 for CYL 1. Then, at $T_1$, a knock sensor coupled to the engine block detects a knock condition, for example, by detecting a vibration within the engine that exceeds a first knock threshold 404. Because one or more cylinders are deactivated during the VDE operating mode, first knock threshold 404 may further depend on the number of cylinders deactivated. For example, when an engine operates at a load where half of the cylinders are deactivated, the power generated in response to driver demand (e.g., from pedal position sensor 194) comes from the remaining active cylinders. As such, in some configurations a knock sensor may be located proximal to deactivated cylinders during the VDE operating mode and so be calibrated for knock detection based on the number and configuration of the deactivated cylinders in the VDE operating mode. If, based on a knock sensor output, the controller determines that the knock occurred within CYL1, in some instances a first spark timing 406 may be adjusted for CYL 1 while the other three active cylinders (e.g., CYLS 3, 5, and 7) continue to operate at MBT. Alternatively, the second knock event at $T_2$ demonstrates that a second spark timing 408 may be adjusted for all active cylinders as a means of reducing engine knock within the engine system.

Because the ignition timing may be simultaneously adjusted for a larger number of cylinders in some instances, the amount of spark retard may be different during partial knock control (e.g., at $T_2$) compared to individual knock control (e.g., at $T_1$). However, the relative depths and shapes are herein shown substantially similar for simplicity. Generally, in some instances, the first spark timing 406 may be smaller in the y-dimension compared to second spark timing 408. In other words, the spark retard may be lower for the first knock event compared to the second event in a manner that depends on the number of cylinders deactivated. Alternatively, in other instances, first spark timing 406 may be larger than second spark timing 408. In general, a short lag time is included between knock detection and timing adjustments made by the engine system. Furthermore, the length of time during which the one or more cylinders are spark retarded compared to MBT may also depend on the engine operating conditions. As such, spark retard may occur for a period of time but slowly return to MBT as the engine continues its reciprocating operations.

With regard to the number of cylinders whose ignition timing is retarded responsive to a knock indication based on a number of cylinders deactivated, in some embodiments, the methods described herein further comprise adjusting a number of cylinders whose ignition timing is retarded based on the engine operating conditions. For example, when operating in the partial cylinder mode, the number of cylinders whose ignition timing is retarded may range from an individual cylinder that is adjusted responsive to a knock indication for the selected cylinder, to multiple cylinders' that are adjusted as a group responsive to a knock indication, to all active cylinders' that are adjusted responsive to a knock indication within a cylinder. Therefore, the methods described include adjusting the number of cylinders whose ignition timing is retarded based on an engine output further performing knock mitigations based on a measurement that exceeds a knock threshold that depends on the number of cylinders deactivated. The methods further include adjusting a throttle position and/or a fuel injection to one or more active cylinders while maintaining valve operation within all cylinders to maintain an engine torque when the number of cylinders whose ignition timing is retarded is adjusted.

Returning to the example of the V8 engine with four deactivatable cylinders, FIG. 4B shows the non-VDE operating mode that operates with a global knock control for reference. For simplicity, individual knock control is not repeated therein, however, in some embodiments individual knock control may also or alternatively be used in the non-VDE operating mode. As described above with respect to FIG. 4A, each cylinder operates at MBT during the engine drive. Then, at $T_1$, a knock sensors detects a knock condition, for example, by detecting a sensor signal above the second knock threshold 412. In response to the detected knock, a global knock response indicated by third spark timing 414 occurs in all engine cylinders (e.g., CYL 1 thru 8) that undergo spark retard in order to reduce engine knock during the full cylinder non-VDE mode of operation. Although the spark retard profile shown is different compared to the profiles of FIG. 4A, in some instances they may have a substantially similar duration depending on the engine operating conditions.

Figure 5:
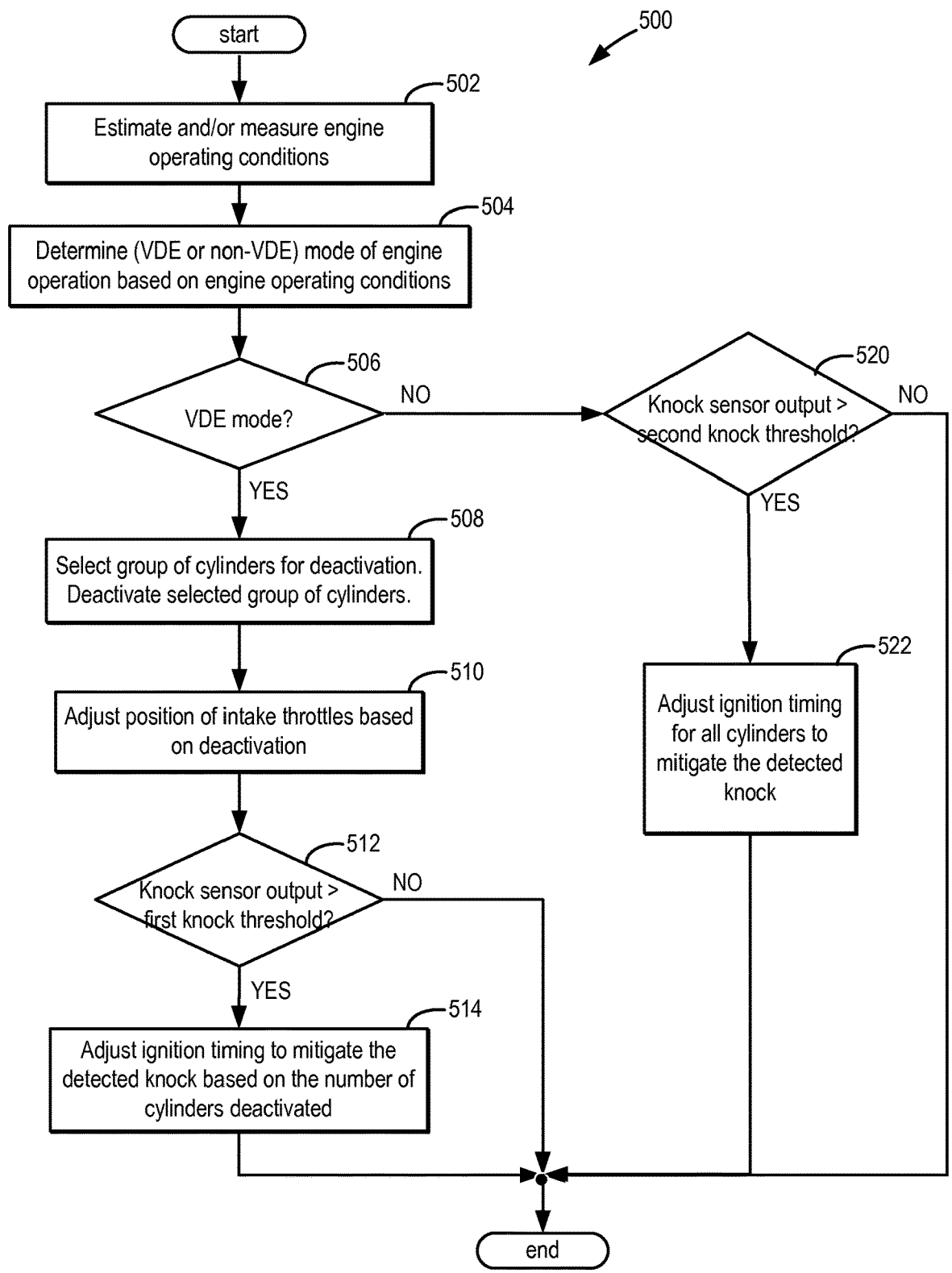
FIG. 5 shows an example flow chart for adjusting an ignition timing based on the engine operating mode.

Turning to FIG. 5, an example routine 500 is depicted that may be executed by an engine controller to determine a mode of operation of the VDE engine system. The method generally comprises: during operation with less active cylinders, adjusting a selected active cylinder's ignition timing responsive to a first knock indication; and during operation with more active cylinders, adjusting multiple cylinders' ignition timing responsive to a second knock indication. Specifically, in one example, based on engine operating conditions (e.g., engine speed and load), it may be determined whether the engine is to be run with all cylinders firing (that is, non-VDE mode) or with one or more cylinders deactivated (that is, VDE mode). If the engine is to be operated in the VDE mode, a group of cylinders and a number of cylinders may be selected for the deactivation (e.g., as shown in FIG. 4A). Based on the selection, the position of various engine system valves and/or throttles may be adjusted to maintain the engine operating conditions (e.g., torque) during the deactivation, as well as to compensate for transient conditions during the transitioning in to and/or out of the VDE mode of operation. In this way, the engine can be smoothly transitioned between VDE and non-VDE modes.

At 502, the routine includes measuring and/or estimating engine operating conditions. The conditions assessed may include barometric pressure, a driver-demanded torque (for example, from a pedal-position sensor), manifold pressure (MAP), manifold air flow (MAF), engine temperature, air temperature, knock limits, etc.

At 504, based on the estimated operating conditions, the routine determines an engine mode of operation (e.g., VDE or non-VDE). In one example, where the engine is a V8 engine, during the VDE mode, the engine may be operated with only one group of cylinders activated (that is, in a V4 mode) while during the non-VDE mode, the engine may be operated with both groups of cylinders activated (that is, in a V8 mode). In an alternate example, instead of one or more cylinders from each bank being deactivated together, two cylinders from each bank of the V8 engine may be selectively deactivated together.

At 506, it may be confirmed whether the engine is to be operated in the VDE (e.g., V4) mode, or with less active cylinders including one or more cylinders deactivated, and without fuel injection and spark. If not, the engine may operate in the non-VDE (e.g., V8) mode, or with more active cylinders including operating with no deactivated cylinders. If yes, then at 508, the routine includes selecting a group of cylinders for deactivation. In one example, such as with reference to the engine system of FIGS. 1-2, the engine may include a first and a second group of cylinders, and an engine controller may select either the first or the second group of cylinders for deactivation based on an engine speed and load. Following the selection, the selected group of cylinders may be deactivated since the two groups of cylinders are selectively adjustable. Herein, the deactivation may include turning off fuel injectors while continuing to open or close intake and exhaust valves so as to pump air through the selected group of cylinders. Thereby, adjusting ignition timing to the deactivated group of cylinders (e.g., the second group) may be coupled to fuel injection while maintaining cylinder valve operation in all cylinders.

At 510, based on the deactivation, the position of one or more engine system valves may be adjusted. The one or more valves that are adjusted may include throttle valve (e.g., valve 158 of FIG. 2) in addition to spark timing from spark plug (e.g., spark plug 292). As noted already, to maintain an engine torque during the transition from non-VDE to VDE operating modes, an intake pressure may be adjusted based on the number of cylinders deactivated.

At 512, method 500 includes determining whether any abnormal cylinder combustion event related to knock has been detected. As elaborated at FIG. 6, based on the deactivation, in particular the number of deactivated cylinders, a first knock threshold and a window for knock detection that depends on the number of cylinders deactivated may be used to indicate knock during partial cylinder operation. As such, the background noise level may vary based on the number of firing cylinders. Thus, by adjusting the windows and thresholds based on the deactivation, abnormal combustion events with small noise levels, occurring during non-VDE modes of engine operation, as well as normal combustion events with large noise levels, occurring during VDE modes of engine operation, may be better distinguished. In one example, when the engine operates in an individual knock control mode, a single cylinder's ignition timing (e.g., CYL 1) may be adjusted responsive to the first knock indication while another cylinder's ignition timing retard (e.g., CYL 3) is adjusted responsive to a third knock indication distinct from the first knock indication. Therefore, the exemplary first knock indication is specific to one single cylinder's knock, and the third knock indication is specific to another single cylinder's knock.

If knock is detected, then at 514, an appropriate mitigating action may be taken. For example, in response to cylinder knock, a spark timing adjustment (e.g., spark retard) may be performed in one or more cylinders. For example, at time $T_1$ of FIG. 4A, ignition timing to CYL 1 was retarded in response to an example knock event detected therein while the vehicle was operated in an individual knock control mode. Alternatively, the vehicle may also be operated in a partial knock control mode and, as such, have the ignition timing to all active cylinders tied together responsive to knock indications. For example, at time $T_2$ of FIG. 4A, ignition timing to all active cylinders was retarded in response to a knock event within CYL 1 while the vehicle was operated in a partial knock control mode. In a similar manner, an example knock event occurring in CYL 3 instead of CYL 1 while in the partial knock control mode will produce the ignition timing retard response shown at time $T_2$ of FIG. 4A. That is, ignition timing retard to all active cylinders may still have occurred for the group of active cylinders. However, if the vehicle was instead in an individual knock control mode when knock was detected within CYL 3, then only the ignition timing retard for CYL 3 may have been adjusted. In this way, identification and distinction of abnormal combustion events may be enhanced by the methods described herein, and further mitigated based on the number of cylinders deactivated during VDE operation, which has the benefit of improving fuel economy. Although the knock detection examples described above are provided with reference to CYLS. 1 and 3. In other examples, knock may also and/or alternatively occur in active CYLS. 5 and 7, or within any combination or sub-combination of the active cylinders thereof. Furthermore, as noted above, the number of active cylinders may be adjusted according to the methods described herein. In some embodiments, mitigating actions may further include adjusting fuel injection by, for instance, delivering fuel via two or more injections (e.g., short bursts) to reduce engine knock. As such, in some embodiments, the methods may optionally adjust a fuel injection and not an ignition timing as was described already. In still other embodiments, an ignition timing and fuel injection may both be adjusted simultaneously to reduce cylinder knock. By reducing the occurrence of cylinder knock, engine degradation can be reduced while improving fuel economy.

Returning to 506, if it is confirmed that the engine is to be operated in the non-VDE (e.g., V8) mode, then no cylinders are deactivated. When the vehicle is operating in this mode, at 520, the routine also includes determining whether any abnormal cylinder combustion event related to knock has been detected by using a second knock threshold for indicating knock during full cylinder operation. However, if knock is detected, then, at 522, the appropriate mitigating action may include adjusting a spark timing (e.g., spark retard) in all of the activated cylinders wherein ignition timing retards to all active cylinders are adjusted together responsive to the second knock indication. Alternatively, in some embodiments, during this mode of operation a spark timing may be selectively adjusted to one or more cylinders as a means of improving fuel economy.

Figure 6:
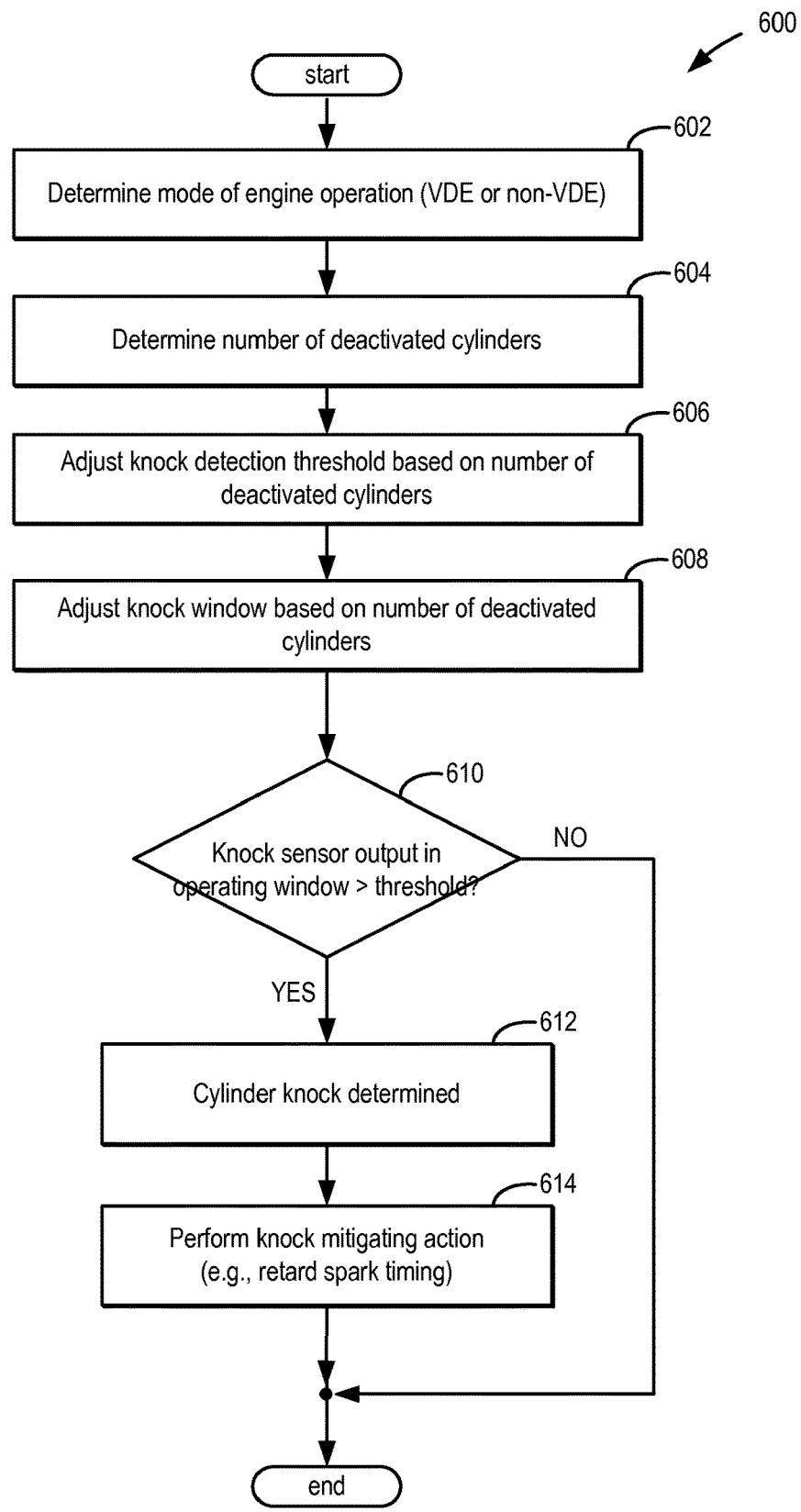
FIG. 6 shows an example flow chart for adjusting a knock threshold based on a number of deactivated cylinders.

Now turning to FIG. 6, an example routine 600 for detecting abnormal combustion events in a variable displacement engine system is described. By adjusting knock detection windows and thresholds based on the deactivation, incorrect identification of regular combustion events as abnormal combustion events, in particular in a boosted VDE engine during a VDE mode of operation, may be reduced.

At 602, the routine includes determining the mode of engine operation (that is, VDE or non-VDE mode). At 604, a number of deactivated cylinders in the selected group of cylinders may be determined. At 606, the routine includes adjusting a knock detection threshold based on the number of deactivated cylinders. At 608, the routine includes adjusting a knock detection window based on the number of deactivated cylinders. The knock detection window may be a crank angle window.

As such, the engine controller may be configured to detect and differentiate abnormal combustion events due to cylinder knocking based on the output (e.g., signal timing, amplitude, intensity, frequency, etc.) of the one or more knock sensors 82 (FIG. 1) distributed along the engine block. By using distinct thresholds and windows for knock detection, knocking may be better diagnosed within the engine system. Since knocking further requires mitigating actions, by improving knock detection, mitigation can also be improved. Specifically, knock is mitigated with spark timing adjustments, therefore by improving the detection of cylinder knock, fuel economy may also be improved.

The adjustments at 606 and 608 may include, for example, increasing the knock detection threshold as the number of deactivated cylinders increases. Likewise, the knock detection window may be increased, or widened, as the number of deactivated cylinders increases. In other words, when a larger number of cylinders are deactivated, the knock detection window may cover a larger crank angle window, while when a smaller number of cylinders are deactivated, the knock detection window may cover a smaller crank angle window.

As such, when more cylinders are deactivated, the average background noise level of cylinder combustion events may be lower. Since the engine control system uses the average background noise level as a reference for determining the threshold against which abnormal combustion events are identified, the lower average noise level during cylinder deactivation can artificially increase the number of cylinder combustion events identified as knocking. The subsequent mitigating actions may reduce fuel economy, engine output, and engine efficiency. Thus, by increasing the threshold when fewer cylinders are enabled, a larger difference between the background noise level and the output of the knock sensors may be required for a combustion event to be considered an abnormal combustion event. In the same way, by using a wider detection window, a timing of the abnormal combustion event may be better correlated with engine operating conditions, thereby enabling enhanced knock detection and control.

In one example, an engine controller may have different knock detection windows and thresholds for the different modes of operation stored in a look-up table in the controller's memory. These may include a first threshold and first window for knock detection when the engine is in the VDE mode and a second window for knock detection when the engine is in the non-VDE mode (with all cylinders firing). In addition to storing data pertaining to knock, the controller may also store data (e.g., acceleration profiles, signal content, etc.) pertaining to cylinder misfires. These may be learned on a per-cylinder basis and used to correct for engine speed profile irregularities, to improve noise signal quality, and improve noise detection capabilities.

Following the adjustments to the knock and pre-ignition detection windows and thresholds, at 610, it may be determined if the output of the one or more knock sensors in the knock detection window is greater than a knock detection threshold. If yes, then at 612, cylinder knock may be determined. Accordingly, at 614, a knock mitigating action may be performed. For example, spark timing may be retarded in the affected cylinder, or group of cylinders as described with respect to FIGS. 4A-B and 5. If no knock is determined at 610, then at 616, the routine may end.

In one example, a boosted variable displacement engine may include a first knock sensor coupled to the first group of cylinders (or first bank) and a second knock sensor coupled to the second group of cylinders (or second bank). The engine controller may estimate the output of the knock sensors relative to a knock detection threshold in a knock detection window. Thereby, cylinder knock may be determined based on the estimation. Furthermore, the windows and thresholds may be adjusted based on the group of cylinders selected for deactivation. As an example, when the second group of cylinders is selected for deactivation, the thresholds may be adjusted based on an output of the first knock sensor but not the second knock sensor. Likewise, when the first group of cylinders is selected for deactivation, the thresholds may be adjusted based on an output of the second knock sensor but not the first knock sensor. In other words, only the output of the knock sensor coupled to the enabled group of cylinders may be used to adjust the knock thresholds, while the output of the knock sensor coupled to the disabled group of cylinders may be disregarded. As another example, the knock detection threshold may be adjusted based on an average output of the first and second knock sensor when neither group of cylinders are deactivated (that is, based on the output of the knock sensors when the engine is in the non-VDE mode only). In this way, by adjusting the threshold, or reference noise levels, against which abnormal combustion events are identified based on the deactivation, the erroneous identification of combustion events as cylinder knock or pre-ignition combustion events may be reduced. As such, this allows engine degradation to be reduced and fuel economy to be improved.

In this way, by adjusting the operation of a variable displacement engine, fuel economy can be improved. In particular, by adjusting ignition timing for one or more engine cylinders responsive to a knock indication during the VDE mode and further adjusting ignition timing for all cylinders responsive to a knock indication during the non-VDE mode, fuel economy may be improved without substantially affecting engine wear.

In one example, a method is provided for an engine with a group of deactivatable cylinders, the cylinder deactivatable via intake and exhaust valve deactivation, while remaining cylinders continue to operate with valve actuation and combustion. The method may comprise: during a first mode of operation with less active cylinders (e.g., with only half of the cylinder deactivated and remaining cylinders carrying out combustion), adjusting only a selected active cylinder's ignition timing responsive to a first knock indication corresponding to that selected active cylinder; during a second mode of operation with less active cylinders (e.g., with only half of the cylinder deactivated and remaining cylinders carrying out combustion), adjusting a plurality of cylinders' (e.g., all active cylinders') ignition timing responsive to a second knock indication corresponding to one or more of the plurality of cylinders; and during operation with more active cylinders (e.g., with all cylinders active), adjusting another plurality of cylinders' ignition timing (e.g., all cylinders' ignition timing) responsive to a third knock indication corresponding to one or more of the another plurality of cylinders. The amounts of ignition timing retard in the first, second, and third modes may be the same, or different. In one example, the amount of ignition timing retard in the first operating mode may be greater than in the second and third operating modes.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
receiving a first knock indication for a selected cylinder;
operating in partial cylinder mode, determining partial cylinder operation is occurring, and receiving the first knock indication, and, responsive to the first knock indication being received and the determining partial cylinder operation is occurring, adjusting only a selected cylinder's ignition timing and maintaining ignition timing of remaining active cylinders; and
operating in a full cylinder mode, determining full cylinder operation is occurring, and receiving the first knock indication, and, responsive to the first knock indication being received and the determining full cylinder operation is occurring, adjusting multiple cylinders' ignition timing.

2. The method of claim 1, wherein operating in the partial cylinder mode includes deactivating a number of cylinders and further comprising, responsive to a second knock indication being received and determining partial cylinder operation is occurring, during operating in the partial cylinder mode with the number of deactivated cylinders, adjusting ignition timing for multiple cylinders, where the second knock indication is received after the first knock indication while operating in the partial cylinder mode with a same number of deactivated cylinders.

3. The method of claim 2, wherein the first knock indication is a knock indication for the selected cylinder; and wherein, while operating in the full cylinder mode, all cylinders' ignition timing is adjusted responsive to the first knock indication being received during operating in the full cylinder mode and responsive to determining full cylinder operation is occurring.

4. The method of claim 2, wherein operating in the partial cylinder mode further comprises deactivating the number of cylinders based on one of engine speed and engine load, wherein the adjusting responsive to the first knock indication being received and determining partial cylinder operation is occurring comprises adjusting the selected cylinder's ignition timing by a first amount of ignition timing retard, and wherein the adjusting responsive to the second knock indication being received and determining partial cylinder operation is occurring comprises adjusting the ignition timing for multiple cylinders by a second amount of ignition timing retard.

5. The method of claim 4, wherein active cylinders comprise a first group and the deactivated cylinders comprise a second group, the two groups being selectively adjustable, and wherein the first amount of ignition timing retard is different from the second amount of ignition timing retard.

6. The method of claim 5, wherein adjusting ignition timing to the first group of cylinders is coupled to adjusting fuel injection while maintaining cylinder valve operation in all cylinders, and wherein the first amount of ignition timing retard is less than the second amount of ignition timing retard.

7. The method of claim 6, wherein adjusting fuel injection includes delivering fuel via two or more injections to reduce engine knock.

8. The method of claim 4, wherein a first knock threshold is used to indicate knock during the partial cylinder operation, and wherein the first knock threshold depends on the number of cylinders deactivated, the first knock threshold increasing as the number of cylinders deactivated increases.

9. The method of claim 8, wherein a second knock threshold is used to indicate knock during the full cylinder operation, the second knock threshold being different from the first knock threshold, and wherein a knock detection window is widened depending on the number of cylinders deactivated, the knock detection window including a wider crank angle as the number of cylinders deactivated increases.

10. A method, comprising:
operating in a first mode with less active cylinders where a number of cylinders are deactivated, determining that operation in the first mode with less active cylinders is occurring, receiving a first knock indication comprising a knock sensor output exceeding a first threshold during the operation in the first mode with less active cylinders, and receiving a second knock indication comprising the knock sensor output exceeding the first threshold during the operation in the first mode with less active cylinders, and:
responsive to receiving the first knock indication and responsive to determining that operation in the first mode with less active cylinders is occurring, adjusting ignition timing of only a subset of active cylinders, the subset of active cylinders being fewer than a number of active cylinders; and
responsive to receiving the second knock indication and responsive to determining that operation in the first mode with less active cylinders is occurring, adjusting ignition timing of all active cylinders; and
operating in a second mode with more active cylinders, determining that operation in the second mode with more active cylinders is occurring, and receiving a third knock indication comprising a knock sensor output exceeding a second threshold during the operation in the second mode with more active cylinders, and:
responsive to receiving the third knock indication and responsive to determining that operation in the second mode with more active cylinders is occurring, adjusting multiple cylinders' ignition timing, wherein the first threshold is different from the second threshold.

11. The method of claim 10, wherein the operation in the first mode with less active cylinders where a number of cylinders are deactivated includes operating with one or more cylinders deactivated and without fuel injection and spark, and wherein the second knock indication occurs after the first knock indication during the operation in the first mode with less active cylinders where a same one or more cylinders are deactivated during receiving the first knock indication and the second knock indication.

12. The method of claim 11, wherein the operation in the second mode with more active cylinders includes operating with no deactivated cylinders.

13. The method of claim 10, wherein ignition timing retard to all active cylinders is adjusted together responsive to the third knock indication, and wherein the adjusting of the ignition timing of only the subset of active cylinders comprises adjusting ignition timing by a lesser amount than the adjusting of the ignition timing of all active cylinders.

14. The method of claim 10, wherein only a single cylinder's ignition timing is adjusted responsive to the first knock indication, and wherein the first threshold is higher than the second threshold.

15. The method of claim 14, wherein the first knock indication is specific to a single cylinder's knock, and the third knock indication is specific to another cylinder's knock, and wherein the first threshold increases as a number of deactivated cylinders increases.

16. A method for mitigating knock in a variable displacement engine, comprising:
deactivating a first number of cylinders and maintaining a second number of cylinders active; and
operating with the first number of cylinders deactivated and the second number of cylinders activated and during the operation with the first number of cylinders deactivated and the second number of cylinders activated:
receiving a first knock indication with the first number of cylinders deactivated and determining operation with the first number of cylinders deactivated is occurring, and, responsive to receiving the first knock indication and determining operation with the first number of cylinders deactivated is occurring, retarding ignition timing by a first amount for a third number of cylinders, the third number less than the second number, wherein the third number is based on the first number; and
receiving a second knock indication, following the first knock indication during a same cylinder deactivation event, with the first number of cylinders deactivated, and determining operation with the first number of cylinders deactivated is occurring, and, responsive to receiving the second knock indication and determining operation with the first number of cylinders deactivated is occurring, retarding ignition timing by a second amount for the second number of cylinders.

17. The method recited in claim 16, wherein the third number of cylinders whose ignition timing is retarded is at least one of:
an individual cylinder responsive to a knock indication for the individual cylinder; and
multiple cylinders responsive to a knock indication for a cylinder.

18. The method recited in claim 16, wherein the first knock indication is based on a knock sensor output exceeding a knock threshold that depends on the first number, the knock threshold increasing as the first number increases.

19. The method recited in claim 17, wherein the third number is based on engine output, and wherein the first amount is less than the second amount.

20. The method recited in claim 16, wherein, in response to retarding the ignition timing of the third number of cylinders, adjusting a throttle position to maintain an engine torque.

21. The method recited in claim 16, further including adjusting a fuel injection to one or more active cylinders while maintaining valve operation within all cylinders, and wherein the third number is one.

* * * * *